United States Patent
Ishihara

(10) Patent No.: US 6,593,954 B2
(45) Date of Patent: *Jul. 15, 2003

(54) MULTIBEAM SCANNING APPARATUS WITH APPROPRIATELY SPACED LIGHT SOURCE

(75) Inventor: Keiichiro Ishihara, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/543,329

(22) Filed: Apr. 5, 2000

(65) Prior Publication Data

US 2003/0038873 A1 Feb. 27, 2003

(30) Foreign Application Priority Data

Apr. 5, 1999 (JP) ............................ 11-097389

(51) Int. Cl.$^7$ ................................................ B41J 2/455
(52) U.S. Cl. ...................................................... 347/233
(58) Field of Search ................................. 347/233, 234, 347/243, 235, 248, 250, 261, 240, 251; 359/204

(56) References Cited

U.S. PATENT DOCUMENTS 6,137,616 A * 10/2000 Inagaki et al. ............... 359/204

FOREIGN PATENT DOCUMENTS

| GB | 2 069 176 A | * 2/1981 | ........... G02B/27/17 |
|---|---|---|---|
| JP | 10-243186 | 9/1998 | |
| JP | 10-282442 | * 10/1998 | ........... G02B/26/10 |

* cited by examiner

Primary Examiner—Hai Pham
(74) Attorney, Agent, or Firm—Fitzpatrick, Cella, Harper & Scinto

(57) ABSTRACT

A multibeam scanning apparatus having a light source with multiple light emitting sections arranged at intervals in the sub-scanning direction, a light deflector for deflecting light beams emitted from the light emitting sections, and a photosensitive drum to be scanned in the main-scanning direction by the deflected light beams. The deflected light beams strike the photosensitive drum with an angle of inclination relative to the normal of the surface of the photosensitive drum as viewed in the sub-scanning direction in order to scan the drum at predetermined intervals. The intervals between the light beams are selected to be smaller than the predetermined intervals based on the angle of inclination.

34 Claims, 6 Drawing Sheets

MULTIBEAM SCANNING APPARATUS WITH APPROPRIATELY SPACED LIGHT SOURCE

BACKGROUND OF THE INVENTION

1. Field of the Invention

This invention relates to a multibeam scanning apparatus. More particularly, the present invention relates to a multibeam scanning apparatus adapted to optically scan the surface of a photosensitive drum by means of a plurality of light beams that are emitted from one or more than one light sources, reflected/deflected by a polygon mirror operating as light deflector and transmitted by way of an imaging optical system having an fθ characteristic in order to record image information. A multibeam scanning apparatus according to the invention will find applications in the field of laser beam printers (LBPs) having a feature of carrying out a process of electrophotography and digital copying machines because it constantly secures regular intervals of scanning lines, which are essential for obtaining a high quality image.

2. Related Background Art

In conventional scanning optical apparatus to be used for image-forming apparatus such as laser beam printers and digital copying machines, the light beam emitted from a light source having a single light emitting section (light emitting spot) and optically modulated according to the image signal applied to it is collimated to a substantially parallel beam and made to pass through an aperture stop adapted to limit the light beam and then enter a cylindrical lens adapted to exert a predetermined refractive power on it only in the sub-scanning direction. While the substantially parallel light beam that enters the cylindrical lens then leaves the lens also as parallel light beam along the main-scanning plane, it is converged along the sub-scanning plane so that consequently it is focussed on the deflection plane (reflection plane) of a light deflector comprising a polygon mirror (rotary polygon mirror) to form a linear image there. The light beam reflected/deflected by the deflection plane of the polygon mirror is then led to the surface of a photosensitive drum by way of an imaging optical system (fθ lens) having an fθ characteristic so that the surface of the photosensitive drum may be optically scanned in order to record image information as the polygon mirror is driven to rotate.

In recent years, in response to the requirements for high speed and high resolution electrophotographic image forming apparatus, there have been proposed various multibeam scanning apparatus comprising a light source having a plurality of light emitting sections and adapted to lead so many light beams emitted from the light emitting sections and modulated optically and independently from each other to the surface of a photosensitive drum in order to optically and simultaneously scan the surface of the photosensitive drum with the plurality of light beams as so many scanning lines.

Meanwhile, the surface of a photosensitive drum operating as recording medium shows a reflectivity of several percent. Thus, in a light beam scanning apparatus, the light beam reflected/deflected by the polygon mirror is inclined by several degrees relative to the normal of the surface of the photosensitive drum in the sub-scanning direction before it strikes the surface of the photosensitive drum in order to eliminate the influence of the return light on the scanning operation of the light beam.

This is also true in multibeam scanning apparatus. More specifically, each and every one of the plurality of light beams reflected/deflected by the polygon mirror is inclined by several degrees relative to the normal of the surface of the photosensitive drum in the sub-scanning direction before it strikes the surface of the photosensitive drum. However, in the case of a multibeam scanning apparatus, the intervals separating the scanning lines can vary as a function of the angle of incidence of the light beams striking the surface of the photosensitive drum to give rise to irregular line intervals on the produced image.

Japanese Patent Application Laid-Open No. 10-243186 discloses a multibeam scanning apparatus adapted to shift the pixel density in the sub-scanning direction by utilizing the fact that the intervals separating the scanning lines can vary as a function of the angle of incidence of the light beams in the sub-scanning direction as the light beams strike the surface of the photosensitive drum. According to the patent document, the angle between the light beams and the surface of the photosensitive drum is modified by changing the position of an optical element of the imaging optical system, the light receiving position of the photosensitive drum and/or the profile of the photosensitive drum at the light receiving position.

However, the operation of changing the position of an optical element of the imaging optical system, the light receiving position of the photosensitive drum and/or the profile of the photosensitive drum at the light receiving position requires highly sophisticated techniques for fine adjustments and hence entails disadvantages from the precision point of view.

SUMMARY OF THE INVENTION

Therefore, it is the object of the present invention to provide a multibeam scanning apparatus that can accurately correct any irregularities of the intervals separating the scanning lines attributable to the angle of incidence of the light beams striking the photosensitive drum as viewed in the sub-scanning direction by selecting appropriate intervals for separating the plurality of light emitting sections of the light source means so as not to give rise to any irregular line intervals on the produced image.

According to the invention, the above object is achieved by providing a multibeam scanning apparatus comprising:

a light source having at least two or more than two light emitting sections arranged at intervals in the sub-scanning direction;

a light deflector for deflecting the two or more than two light beams emitted respectively from the two or more than two light emitting sections; and a photosensitive drum to be scanned in the main-scanning direction by the two or more than two light beams deflected by the light deflector, the two or more than two light beams being adapted to strike the photosensitive drum with an angle inclined relative to the normal of the surface of the photosensitive drum as viewed in the sub-scanning direction;

wherein the intervals separating the light emitting sections of the light source in the sub-scanning direction are so selected as to arrange the scanning positions of the two or more than two light beams at regular intervals on the photosensitive drum.

According to the invention, there is also provided a multibeam scanning apparatus comprising:

a light source having a plurality of light emitting sections arranged at intervals in the sub-scanning direction;

a light deflector for deflecting the plurality of light beams emitted respectively from the plurality of light emitting sections; and a photosensitive drum to be scanned in the main-scanning direction by the plurality of light beams deflected by the light deflector, the plurality of light beams being adapted to strike the photosensitive drum with an angle of inclination of θ relative to the normal of the surface of the photosensitive drum as viewed in the sub-scanning direction so as to make the photosensitive drum to be scanned by the light beams at predetermined intervals;

wherein the intervals between any two adjacently located light beams of the plurality of light beams striking the photosensitive drum are so selected as to be smaller than the predetermined intervals on the basis of the angle θ.

According to the invention, there is also provided a multibeam scanning apparatus comprising:

a light source having a plurality of light emitting sections arranged at intervals in the sub-scanning direction;

a light deflector for deflecting the plurality of light beams emitted respectively from the plurality of light emitting sections; and a photosensitive drum to be scanned in the main-scanning direction by the plurality of light beams deflected by the light deflector, the plurality of light beams being adapted to strike the photosensitive drum with an angle of inclination of θ relative to the normal of the surface of the photosensitive drum as viewed in the sub-scanning direction so as to make the photosensitive drum to be scanned by the light beams at predetermined intervals;

wherein the intervals separating the light emitting sections of the light source in the sub-scanning direction are so selected as to be smaller than the predetermined intervals on the basis of the angle θ.

According to the invention, there is also provided a multibeam scanning apparatus comprising:

a light source having at least three or more than three light emitting sections arranged at intervals in the sub-scanning direction;

a light deflector for deflecting the three or more than three light beams emitted respectively from the three or more than three light emitting sections; and a photosensitive drum to be scanned in the main-scanning direction by the three or more than three light beams deflected by the light deflector, the three or more than three light beams being adapted to strike the photosensitive drum with an angle inclined relative to the normal of the surface of the photosensitive drum as viewed in the sub-scanning direction;

wherein the intervals separating the light emitting sections of the light source in the sub-scanning direction are so selected as to make the difference between the angles of incidence of any two adjacently located light beams of the three or more than three light beams striking the photosensitive drum equal to a constant value.

According to the invention, there is also provided a multibeam scanning apparatus comprising:

a light source having a plurality of light emitting sections arranged at intervals in the sub-scanning direction, the light source being adapted to cyclically skip one or more than one scanning lines;

a light deflector for deflecting the plurality of light beams emitted from the light source; and a photosensitive drum to be scanned in the main-scanning direction by the plurality of light beams deflected by the light deflector, the plurality of light beams being adapted to strike the photosensitive drum with an angle of inclination of θ relative to the normal of the surface of the photosensitive drum as viewed in the sub-scanning direction so as to make the photosensitive drum to be scanned by the light beams at predetermined intervals;

wherein the intervals separating the light emitting sections of the light source in the sub-scanning direction are so selected as to be smaller than the predetermined intervals on the basis of the angle θ.

According to the invention, there is also provided a multibeam scanning apparatus comprising:

a light source having at least three or more than three light emitting sections arranged at intervals in the sub-scanning direction, the light source being adapted to cyclically skip one or more than one scanning lines;

a light deflector for deflecting the three or more than three light beams emitted from the light source; and a photosensitive drum to be scanned in the main-scanning direction by the three or more than three light beams deflected by the light deflector, the three or more than three light beams being adapted to strike the photosensitive drum with an angle inclined relative to the normal of the surface of the photosensitive drum as viewed in the sub-scanning direction;

wherein the intervals separating the light emitting sections of the light source in the sub-scanning direction are so selected as to make the difference between the angles of incidence of any two adjacently located light beams of the three or more than three light beams striking the photosensitive drum equal to a constant value.

According to the invention, there is also provided a multibeam scanning apparatus comprising:

a light source having a plurality of light emitting sections arranged at intervals in the sub-scanning direction;

a light deflector for deflecting the plurality of light beams emitted respectively from the plurality of light emitting sections;

a photosensitive drum to be scanned in the main-scanning direction by the plurality of light beams deflected by the light deflector, the plurality of light beams being adapted to strike the photosensitive drum with an angle of inclination of e relative to the normal of the surface of the photosensitive drum as viewed in the sub-scanning direction; and a detection element arranged at a position optically equivalent to that of the photosensitive drum to detect the imaging positions of the plurality of light beams emitted from the light source;

wherein the detection element is inclined in the sub-scanning direction by an angle of θ relative to the normal of the surface of the photosensitive drum in order to adjust the intervals of the light emitting sections of the light source in the sub-scanning direction on the basis of the imaging positions as detected by the detection element.

According to the invention, there is also provided a multibeam scanning apparatus comprising:

a light source having at least three or more than three light emitting sections arranged at intervals in the sub-scanning direction, the light source being adapted to cyclically skip one or more than one light emitting sections and make a selected light emitting section emit a light beam;

a light deflector for deflecting the plurality of light beams emitted from the light source;

a photosensitive drum to be scanned in the main-scanning direction by the plurality of light beams deflected by the light deflector, the plurality of light beams being adapted to strike the photosensitive drum with an angle of inclination of θ relative to the normal of the surface of the photosensitive drum as viewed in the sub-scanning direction; and a detection element arranged at a position optically equivalent to that of the photosensitive drum to detect the imaging positions of the plurality of light beams emitted from the light source;

wherein the detection element is inclined in the sub-scanning direction by an angle of θ relative to the normal of the surface of the photosensitive drum in order to adjust the intervals of the light emitting sections of the light source in the sub-scanning direction on the basis of the imaging positions as detected by the detection element.

DESCRIPTION OF THE PREFERRED EMBODIMENTS

[Embodiment 1]

Figure 1A:
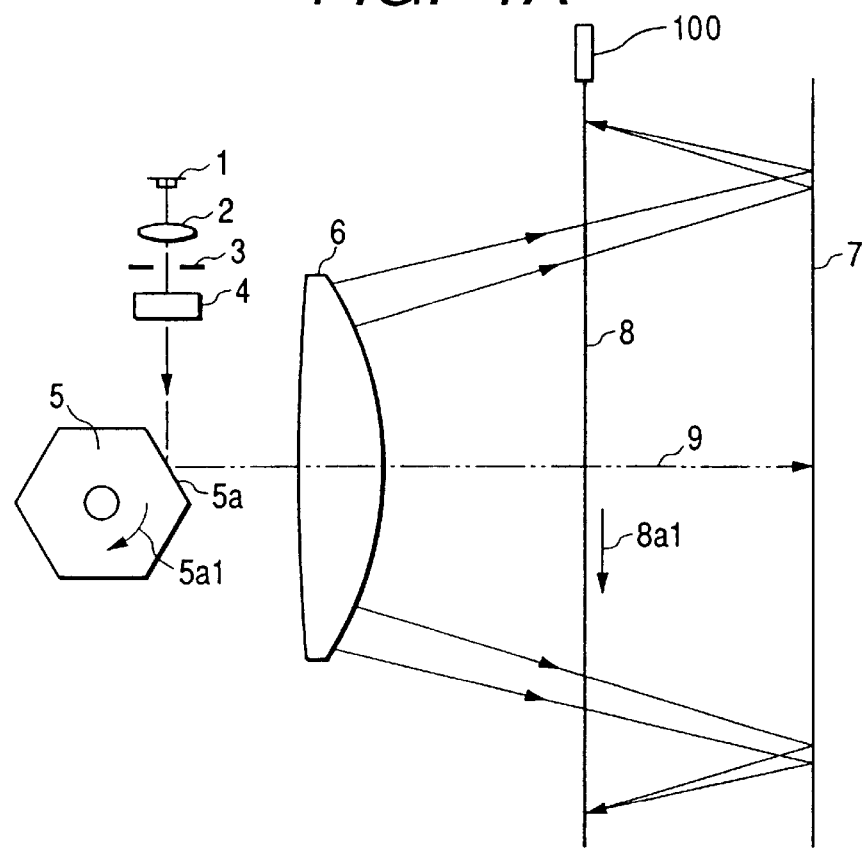
FIGS. 1A and 1B are schematic cross sectional views of Embodiment 1 of multibeam scanning apparatus according to the invention taken along the main-scanning direction and the sub-scanning direction respectively, showing a principal part thereof.
Figure 1B:
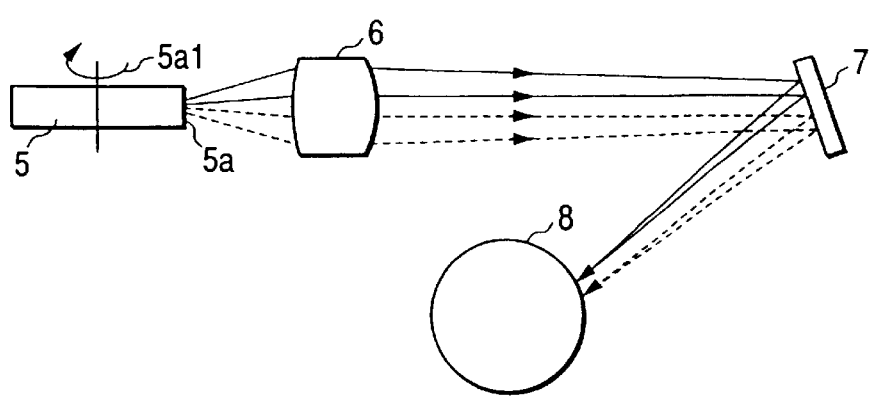

FIG. 1A is a schematic cross sectional view of Embodiment 1 of multibeam scanning apparatus according to the invention and applied to an image forming apparatus such as a laser beam printer or a digital copying machine as taken along the main-scanning plane, showing a principal part thereof. FIG. 1B is a schematic cross sectional view of Embodiment 1 taken along the sub-scanning plane, showing also a principal part thereof.

Referring to FIGS. 1A and 1B, reference numeral 1 denotes a light source comprising a semiconductor laser array formed by arranging a plurality of light emitting sections (light emitting spots) adapted to emit respective light beams that are optically and independently modulated.

Reference numeral 2 denotes a collimator lens for transforming the plurality of light beams emitted from the light source into so many substantially collimated beams. Reference numeral 3 denotes an aperture stop for limiting (the quantity of light of) the light beams passing therethrough. Reference numeral 4 denotes a cylindrical lens having a predetermined refractive power only in the sub-scanning direction and adapted to focus the plurality of light beams that have passed through the aperture stop 3 on the deflection plane (reflection plane) 5a of light deflector 5, which will be described hereinafter, as substantially linear images within the sub-scanning plane.

Note that the collimator lens 2, the aperture stop 3 and the cylindrical lens 4 are so many elements of the optical system for incident light of the apparatus.

Reference numeral 5 denotes a light deflector typically comprising a polygon mirror (rotary polygon mirror) that is adapted to be driven to rotate at a constant rate in the direction indicated by arrow 5a1 in FIGS. 1A and 1B by a drive means such as an electric motor (not shown).

Reference numeral 6 denotes an imaging optical system (imaging means) showing an fθ characteristic and comprising a single scanning lens whose optical power differs between the main-scanning direction and the sub-scanning direction.

Reference numeral 7 denotes a fold mirror for folding the optical paths of the plurality of light beams passing through the scanning lens 6. Reference numeral 8 denotes a photosensitive drum operating as recording medium and adapted to rotate at a constant rate in the sub-scanning direction.

With the embodiment having the above described configuration, the plurality of (two in this embodiment) divergent light beams emitted from the light source 1 and optically and independently modulated as a function of the image information applied to it are transformed into substantially parallel light beams by the collimator lens 2 and limited by the aperture stop 3 (in terms of quantity of light) before entering the cylindrical lens 4. The plurality of substantially parallel light beams entering the cylindrical lens 4 are made to leave the lens 4 without any modification in the main-scanning plane while they are converged in the sub-scanning plane so that they are focussed on the deflection plane 5a of the light deflector (polygon mirror) 5 to produce substantially linear respective images (running along the main-scanning direction) there. Then, the plurality of light beams (as indicated respectively by solid lines and broken lines in FIG. 1B) deflected by the deflection plane 5a of the light deflector 5 are made to pass through the scanning lens 6 and tilted by angle θ in the sub-scanning direction relative to the normal of the surface of the photosensitive drum 8 by means of the fold mirror 7 before they strike the surface of the photosensitive drum 8 while the light deflector 5 is driven to rotate in the direction of arrow 5a1 so that the light beams may optically scan the surface of the photosensitive drum 8 at a constant speed in the direction of arrow 8a1 (main-scanning direction). As a result, the obtained image is recorded on the surface of the photosensitive drum 8, or the recording medium, with a desired pixel density.

The gap Liθ (mm) separating the two light beams coming from the light source 1 on the surface of the photosensitive drum 8 in the sub-scanning direction is normally defined by formula (1) below, using the pixel density A (dpi) in the sub-scanning direction.

$$Li\theta = \frac{25.4}{A} \quad (1)$$

On the other hand, the gap Lo (mm) separating the two light emitting sections of the light source 1 in the sub-scanning direction is defined by equation (2) below, using the gap Liθ separating the two light beams on the surface of the photosensitive drum and the absolute value βs of the total lateral magnification of the overall optical system from the light source 1 to the photosensitive drum 8 (including the entrance optical system and the imaging optical system) in the sub-scanning direction (hereinafter referred to as "the total lateral magnification in the sub-scanning direction").

$$Lo = \frac{Li\theta}{\beta s} \quad (2)$$

Figure 2:
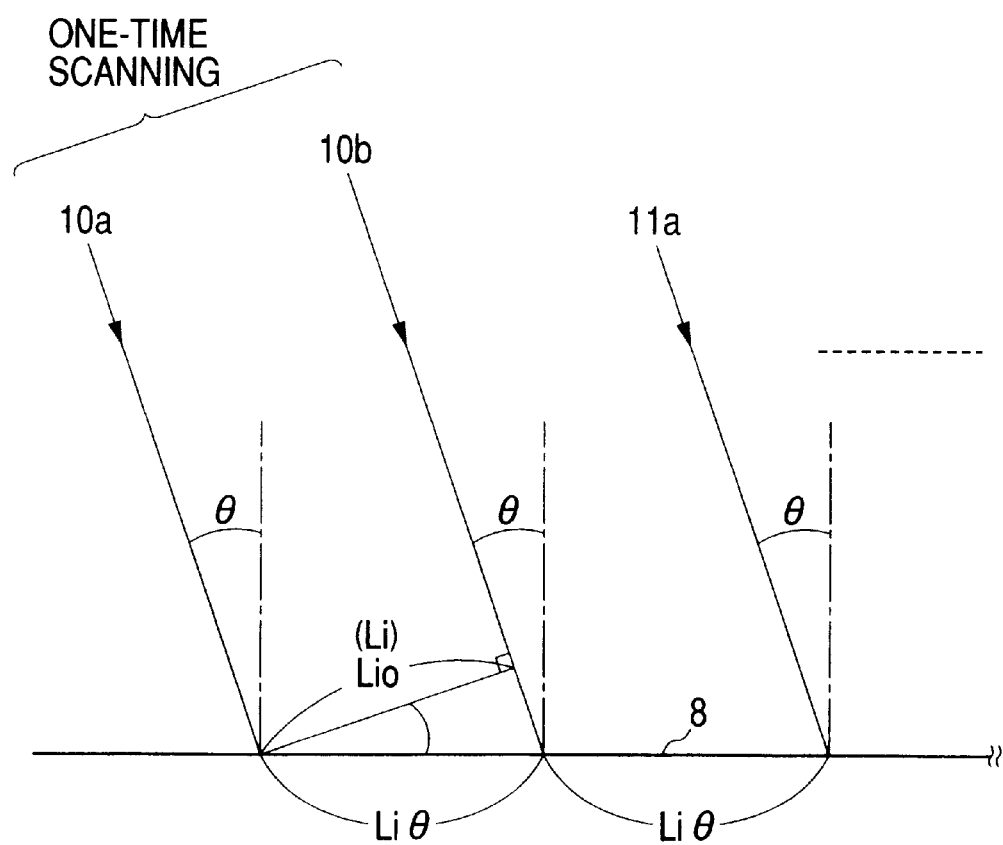
FIG. 2 is a schematic cross sectional view of Embodiment 1 of multibeam scanning apparatus according to the invention taken along the sub-scanning direction, illustrating a plurality of light beams striking the surface of the photosensitive drum thereof.

FIG. 2 is a schematic cross sectional view of Embodiment 1 of multibeam scanning apparatus according to the invention taken along the sub-scanning direction, illustrating a plurality of light beams striking the surface of the photosensitive drum 8.

With this embodiment of multibeam scanning apparatus, each of the two light beams 10*a* and 10*b* emitted from the light source (not shown) is tilted by an angle of θ (incident angle) relative to the normal of the surface of the photosensitive drum 8 in order to eliminate any return light from the surface of the photosensitive drum 8 for the operation of optically scanning the latter. While return light can be substantially eliminated when the incident angle θ is found to be θ≦2(deg), the effect of eliminating return light is remarkable when the incident angle θ is large.

With this embodiment, the number of light beams is n=2, the pixel density in the sub-scanning direction is A=1200 (dpi) and the radius of curvature of the outer periphery of the photosensitive drum 8 in the sub-scanning plane is r=12 (mm). Additionally, since the two light beams 10*a* and 10*b* are adapted to scan a peripherally limited area of the photosensitive drum 8, the surface of the photosensitive drum 8 can be approximated by a straight line within the sub-scanning plane. Then, the gap Liθ (mm) between the two light beams 10*a* and 10*b* on the surface of the photosensitive drum in the sub-scanning direction is expressed by formula (3) below, which is greater than the initially defined gap Li (Li0) (mm) separating the two beams 10*a* and 10*b*.

$$Li\theta = \frac{Li}{\cos\theta} \quad (3)$$

This means that the gap separating the plurality of scanning lines drawn by one optical scanning operation is broadened but the one separating them from the plurality of scanning lines drawn by the next optical scanning operation is narrowed. The net result is irregular line intervals on the obtained image.

To overcome this problem, with the above embodiment, the gap Li (mm) separating a light beam 10*a* and another light beam 10*b* located adjacent to the first light beam 10*a* at a position near the surface of the photosensitive drum 8 is reduced from the predetermined gap Liθ (mm) as a function of angle θ.

More specifically, if absolute value of the total lateral magnification of the overall optical system (including the entrance optical system and the imaging operation system) arranged between the light source 1 and the photosensitive drum 8 in the sub-scanning direction is βs (times) and the angle of incidence of a light beam striking the surface of the photosensitive drum 8 in the sub-scanning direction is θ (rad) while the pixel density in the sub-scanning direction is A (dpi) and the gap separating the plurality of light emitting sections in the sub-scanning direction is Lo (mm), the gap Lo (mm) separating the plurality of light emitting sections is so selected as to satisfy the requirement of formula (4) below in order to precisely correct the irregularity of the intervals separating the scanning lines due to the angle of incidence of the light beams striking the photosensitive drum 8 by reducing the gap Li (mm) separating the light beams on a line located near the surface of the photosensitive drum 8 in the sub-scanning direction from the gap Liθ (mm) predetermined on the basis of the pixel density in the sub-scanning direction. With this arrangement, the scanning lines on the surface of the photosensitive drum 8 in the sub-scanning direction are arranged at regular intervals.

The expression of "predetermined gap" as used herein refers to the gap separating any two adjacently located scanning lines in the sub-scanning direction in correspondence to the pixel density.

$$\frac{25.4 \times \cos\theta}{A \times \beta s} \times 0.95 \le Lo \le \frac{25.4 \times \cos\theta}{A \times \beta s} \times 1.05 \quad (4)$$

It has been experimentally proven that the errors in the intervals of scanning lines do not give rise to any visually remarkable irregularity if they are less than ±10% of the intervals of scanning lines as defined by the pixel density in the sub-scanning direction and the range defined by formula (4) above provides a certain degree of freedom for selecting the gap without problem.

Then, the gap Li (mm) separating two adjacently located light beams on a line located near the surface of the photosensitive drum 8 is expressed by formula (a) below.

$$Li = \frac{25.4 \times \cos\theta}{A} \quad (a)$$

If the radius of curvature of the outer periphery of the photosensitive drum 8 in the sub-scanning plane is r (mm), the gap Li (mm) satisfies the requirement expressed by the formula below.

$$r\left\{\sin\left(\frac{25.4}{A \times r} + \theta\right) - \sin\theta\right\} \times 0.95 \le Li \le r\left\{\sin\left(\frac{25.4}{A \times r} + \theta\right) - \sin\theta\right\} \times 1.05$$

In the embodiment, a detection element 100 (image pickup element) such as a CCD is arranged at a position optically equivalent to the surface of the photosensitive drum 8 in order to detect the imaging positions of the plurality of light beams emitted from light source 1. FIG. 1A depicts one possible position of detection element 100. The detection element 100 is tilted by an angle equal to angle θ relative to the normal of the photosensitive drum 8 and adapted to detect the imaging positions of the plurality of light beams. Then, the irregularity of the intervals of scanning lines that can arise due to the angle of incidence of the light beams striking the surface of the photosensitive drum 8 is corrected by regulating the gap Lo (mm) separating the plurality of light emitting sections of the light source 1 on the basis of the information (e.g., the gap separating the imaging positions of the plurality of light beams) detected by the detection element 100.

Table 1 below shows values that can be used for the embodiment.

TABLE 1

| pixel density in sub-scanning direction | lateral magnification of entrance optical system in sub-scanning direction | lateral magnification of imageing otical system in sub-scanning direction |
|---|---|---|
| A<br>1200 (dpi) | $\beta s1$<br>1.765 (times) | $\beta s2$<br>2.878 (times) |
| total lateral magnification in sub-scanning direction | angle of incidence on photosensitive drum in sub-scanning direction | gap separating light emitting sections in sub-scanning direction |
| $\beta s$<br>5.080 (times) | $\theta$<br>20.0 (deg) | Lo<br>3.915 (pm) |

If the values listed in Table 1 above are used, a desired value can be provided for both the gap $Li\theta$ separating the two beams 10a and 10b on the surface of the photosensitive drum 8 in the sub-scanning direction and the gap $Li\theta$ separating the light beam 10b and the light beam 10a arriving the photosensitive drum 8 for the next scanning cycle. In other words, any two adjacently located scanning lines are separated by a practically constant gap (that corresponds to the pixel density in the sub-scanning direction). Thus, this embodiment of multibeam scanning apparatus according to the invention provides a high quality image that is free from the problem of irregular intervals of scanning lines.

While a pair of light beams are used to optically scan the surface of the photosensitive drum 8 simultaneously in this embodiment, three or more than three light beams may alternatively be used to optically scan the surface of the photosensitive drum 8. Then, the irregularity of the intervals of scanning lines on the surface of the photosensitive drum 8 can be satisfactorily corrected by appropriately regulating the gap separating the plurality of light emitting sections of the light source 1 in response to the angle of incidence of the plurality of light beams striking the surface of the photosensitive drum 8. Additionally, the semiconductor laser array of the light source may be replaced by a plurality of semiconductor lasers that are arranged appropriately.

While the gap separating the plurality of light emitting sections in the sub-scanning direction can be regulated by means of rotation or by means of parallel translation in the sub-scanning direction, techniques other than those may also feasibly be used if such techniques can successfully regulate the gap separating the plurality of light emitting sections in the sub-scanning direction on the basis of the information obtained by the detection element.

[Embodiment 2]

Figure 3:
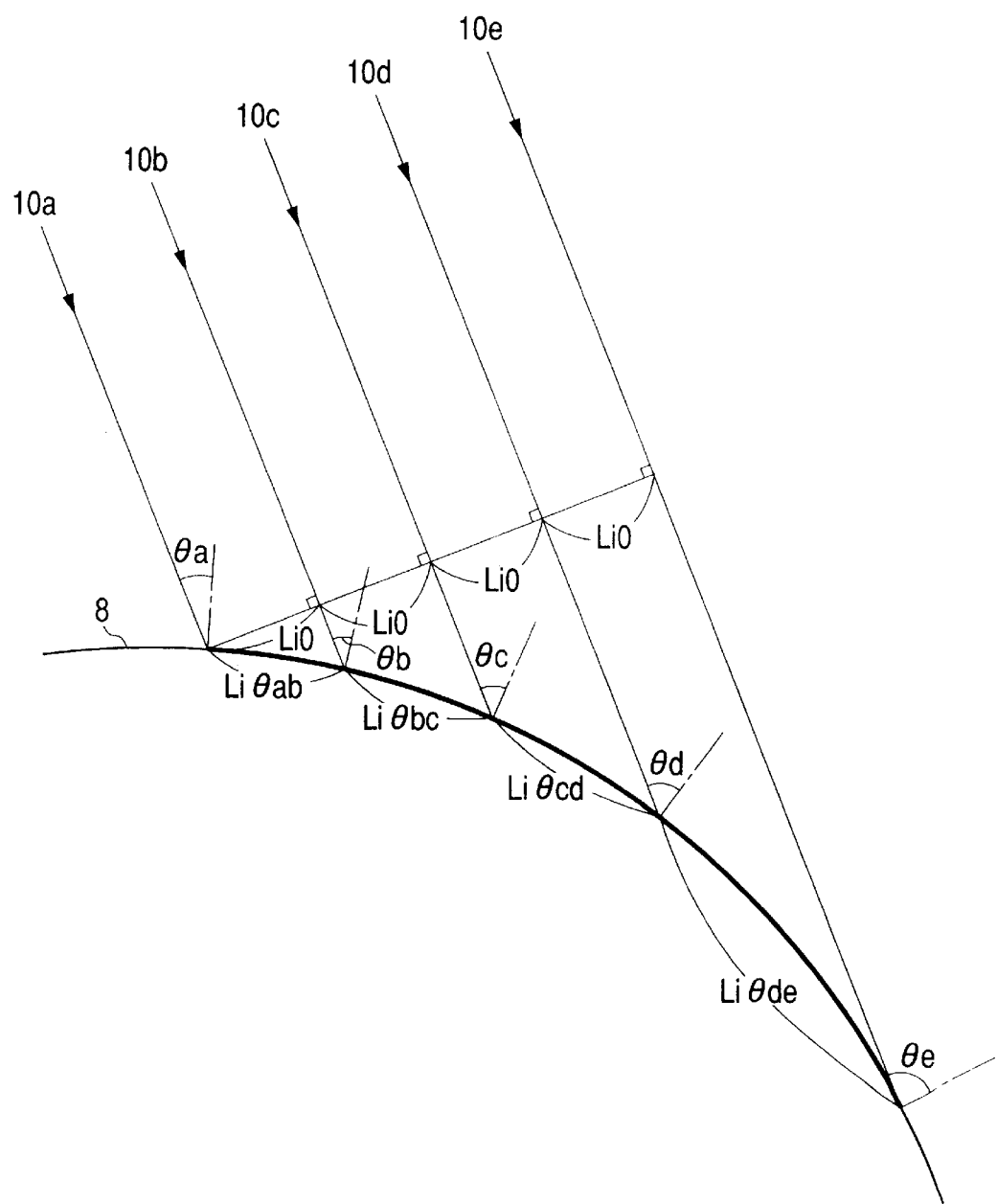
FIG. 3 is a schematic cross sectional view of Embodiment 2 of multibeam scanning apparatus according to the invention taken along the sub-scanning direction, illustrating a plurality of light beams striking the surface of the photosensitive drum thereof.

FIG. 3 is a schematic cross sectional view of Embodiment 2 of multibeam scanning apparatus according to the invention taken along the sub-scanning direction, illustrating a plurality of light beams striking the surface of the photosensitive drum thereof.

With this embodiment, the number of light beams is n=5 and the pixel density in the sub-scanning direction is A=600 (dpi) while the radius of curvature of the outer periphery of the photosensitive drum 8 in the sub-scanning plane is r=5(mm). Then, an image forming apparatus comprising this embodiment operates at high speed if a relatively small photosensitive drum is used.

In this embodiment, the five divergent light beams that are emitted from a light source (not shown) and optically and independently modulated according to the image information applied to it are reflected/deflected by an optical deflector (not shown) and then made to strike the surface of a photosensitive drum 8 with an angle of inclination of $\theta$ relative to the normal of the surface of the photosensitive drum 8 by means of an imaging optical system (not shown) and a fold mirror (not shown) so that the surface of the photosensitive drum 8 is scanned by the five light beams simultaneously.

Since the number of scanning light beams is large and a compact photosensitive drum 8 is used, it is no longer appropriate to assume the cross section of the surface of the photosensitive drum 8 in the sub-scanning direction to be approximately linear and it should be considered to be an arc.

With this embodiment, the gap Li (Li0) separating two adjacent light beams near the surface of the photosensitive drum 8 is held to a constant value, which is determined as a function of the pixel density in the sub-scanning direction as in the case of Embodiment 1. However, the gap separating two adjacent light beams on the arcuate surface of the photosensitive drum 8 will be increased as the angle of incidence rises. More specifically, referring to FIG. 3, while the light beams 10a through 10e are substantially parallel to each other and any two adjacent light beams thereof are separated by a constant gap of Li0, the angle of incidence $\theta a$ (relative to the normal of the surface of the photosensitive drum) of the light beam 10a striking the surface of the photosensitive drum 8 is $\theta a$=30.0 (deg), . . . and the angle of incidence $\theta d$ of the light beam 10d striking the surface of the photosensitive drum 8 is $\theta d$=31.7 (deg) to make them different from each other so that the gap separating the light beams 10d and 10e ($Li\theta de$) is greater than the gap separating the light beams 10a and 10b ($Li\theta ab$).

Figure 4:
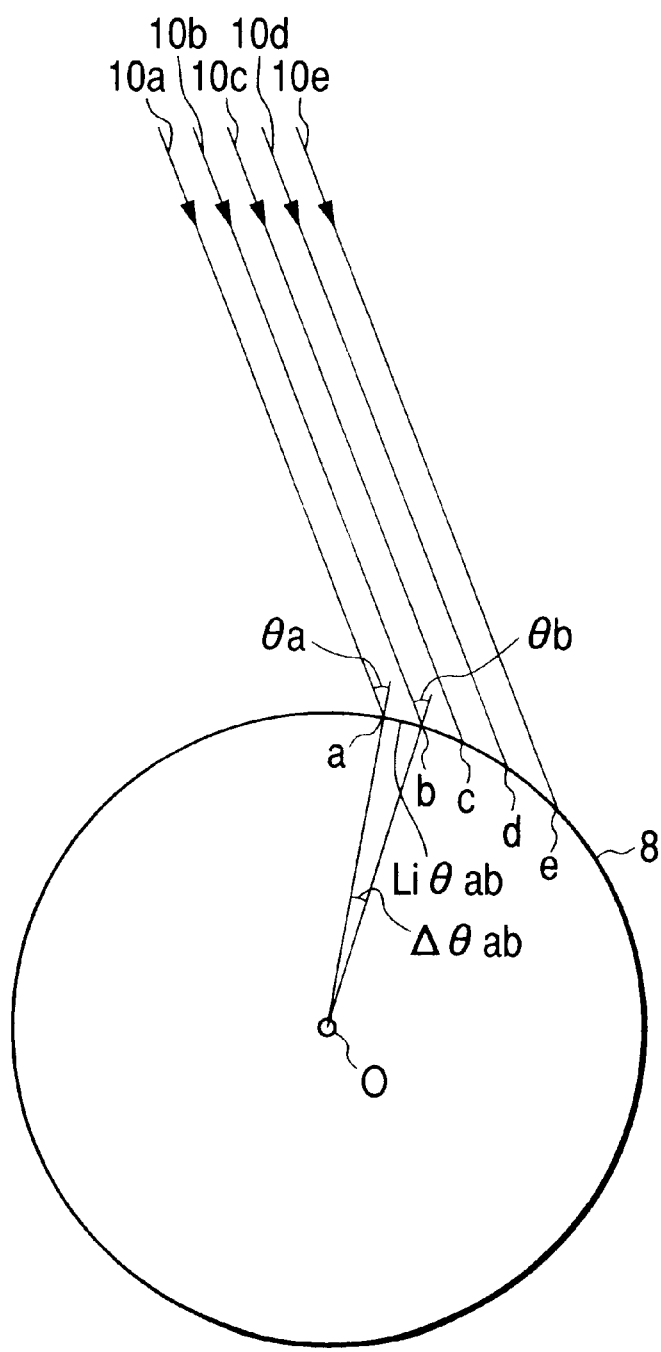
FIG. 4 is a schematic cross sectional view of Embodiment 2 of multibeam scanning apparatus according to the invention taken along the sub-scanning direction, illustrating a plurality of light beams striking the surface of the photosensitive drum thereof.

FIG. 4 is a schematic cross sectional view of Embodiment 2 of multibeam scanning apparatus according to the invention taken along the sub-scanning direction, illustrating the five light beams striking the surface of the photosensitive drum thereof.

Referring to FIG. 4, if the positions at which the light beams 10a, 10b, . . . and 10e arrive on the surface of the photosensitive drum are denoted respectively by a, b, . . . and e and the center of curvature of the photosensitive drum 8 in the sub-scanning plane is o while the angle of incidence of the light beam 10a on the surface of the photosensitive drum 8 is $\theta a$(rad) and the angle of incidence of the light beam 10b on the surface of the photosensitive drum 8 is $\theta b$ (rad), the angle $\angle aob$ formed by the lines ao and bo is expressed by formula (5) below.

$$\angle aob = \theta b - \theta a = \Delta\theta ab \tag{5}$$

On the other hand, the arc length $Li\theta ab$ separating the positions a and b on the surface of the photosensitive drum 8 having a radius of curvature of r (mm) is expressed by formula (6) below.

$$Li\theta ab = \Delta\theta ab \times r \tag{6}$$

Thus, the scanning lines on the surface of the photosensitive drum 8 are separated at regular intervals if the difference $\Delta\theta$ between the angles of incidence of any two adjacent light beams is identical for all the light beams.

Therefore, with this embodiment, the difference $\Delta\theta$ between the angle of incidence of one of the light beams emitted from the light source and striking the surface of the photosensitive drum in the sub-scanning direction and that of an adjacent one of the light beams emitted from the light source and striking the surface of the photosensitive drum in the sub-scanning direction is made identical for all the light beams emitted from the light source.

Then, the difference Δθ (rad) between the angles of incidence of two adjacent light beams selected for realizing regular intervals of scanning lines on the surface of the photosensitive drum 8 in the sub-scanning direction that are equal to the gap Liθ (mm) predetermined on the basis of the pixel density A (dpi) is expressed by formula (7) below, provided that one of the light beams strikes the surface of the photosensitive drum 8 with an angle of incidence of θ (rad).

$$\Delta\theta = \sin^{-1}\left(\frac{25.4}{A \times r} + \sin\theta\right) - \theta \quad (7)$$

$$0 \leq \theta < \frac{\pi}{2}$$

Thus, the scanning lines on the surface of the photosensitive drum 8 can be corrected to show regular intervals (to be defined by the pixel density in the sub-scanning direction) by selecting a gap for separating any two adjacent ones of the plurality of light emitting sections of the light source in the sub-scanning direction that produces a value satisfying the requirement of formula (7) above for the difference Δθ between the angle of incidence of one of the light beams and that of an adjacent one.

More specifically, if the angle of incidence in the sub-scanning direction of one of the plurality of beams emitted from the light source and striking the surface of the photosensitive drum 8 is θ (rad) and the radius of curvature of the outer periphery of the photosensitive drum 8 in the sub-scanning plane is r (mm) while the pixel density in the sub-scanning direction is A (dpi), the absolute value of the total lateral magnification in the sub-scanning direction of the overall optical system between the light source and the photosensitive drum 8 is βs (times) and the gap separating any two adjacently located ones of the light emitting sections of the light source in the sub-scanning direction is Lo (mm), regular intervals will be provided for the scanning lines on the surface of the photosensitive drum when the requirement of formula (8) is satisfied.

$$Lo = \frac{r}{\beta s}\left\{\sin\left(\frac{25.4}{A \times r} + \theta\right) - \sin\theta\right\} \quad (8)$$

With this embodiment, any adjacently located ones of the plurality of light emitting sections of the light source are separated from each other in the sub-scanning direction by a gap that satisfies the requirement of formula (8) above.

Meanwhile, if the angles of incidence of the light beams 10a, 10b, 10c, 10d and 10e emitted from the light source and striking the surface of the photosensitive drum 8 are respectively θa, θb, θc, θd and θe and the gaps separating the plurality of light emitting sections in the sub-scanning direction are Loθab, Loθbc, Loθcd and Loθde, it will be seen that $$Lo\theta ab \neq Lo\theta bc \neq Lo\theta cd \neq Lo\theta de$$

because $$\theta a < \theta b < \theta c < \theta d < \theta e.$$

Thus, the light emitting sections of the light source are arranged at irregular intervals in the sub-scanning direction in order to meet the requirement of formula (8) above and make the difference between the angles of incidence of any two adjacent light beams identical for all the light beams. Then, the scanning lines on the surface of the photosensitive drum 8 can be arranged at regular intervals, which show an appropriate value as a function of the pixel density in the sub-scanning direction. It will be appreciated that the plurality of light beams emitted respectively from the plurality of light emitting sections are arranged at irregular intervals.

Table 2 below shows values that can be used for the embodiment.

TABLE 2

| pixel density in sub-scanning direction | A | 600 (dpi) |
|---|---|---|
| total latral magnification in sub-scanning direction | βs | 9 (times) |
| radius of curvature of outer periphery of photosensitive drum in sub-scanning plane | r | 5 (mm) |

| | angle of incidence on photosensitive drum in sub-scaning direction | difference of angles of incidence between a light beam and an adjacent light beam | gap separating light emitting sections in sub-scanning direction |
|---|---|---|---|
| | θ | Δθ | Lo |
| light beam 1 | 30.000 (deg) | 0.485 (deg) | 4.064 (μm) |
| light beam 2 | 30.485 (deg) | 0.485 (deg) | 4.043 (μm) |
| light beam 3 | 30.970 (deg) | 0.485 (deg) | 4.023 (μm) |
| light beam 4 | 31.455 (deg) | 0.485 (deg) | 4.002 (μm) |
| light beam 5 | 31.940 (deg) | | |

As seen from Table 2 above, while the angles of incidence of the light beams striking the surface of the photosensitive drum 8 of this embodiment differ from each other, the difference Δθ between the angles of incidence of any two adjacently located light beams can be made equal to a constant value for all the light beam by appropriately adjusting the gaps separating the plurality of light emitting sections in the sub-scanning direction.

Table 3 below shows the intervals of the scanning lines on the surface of the photosensitive drum before the correction as expressed by formula (2) above and those after the correction as expressed by formula (8).

TABLE 3

| | before correction of line intervals | after correction of line intervals | amount of correction |
|---|---|---|---|
| | Liθ | Liθ' | ΔLiθ |
| Liθab | 49.022 (μm) | 42.333 (μm) | −6.689 (μm) |
| Liθbc | 49.307 (μm) | 42.333 (μm) | −6.974 (μm) |
| Liθcd | 49.603 (μm) | 42.333 (μm) | −7.269 (μm) |
| Liθde | 49.908 (μm) | 42.333 (μm) | −7.575 (μm) |

As seen from Table 3, while the intervals of the scanning lines differ from the desired value to a large extent depending on the angles of incidence of the light beams striking the surface of the photosensitive drum 8 and the difference Δθ between two adjacent light beams before the correction, they can be made to agree with a desired value, not depending on the angles of incidence of the light beams striking the surface of the photosensitive drum 8 and the number of light beams optically scanning the surface of the photosensitive drum 8 simultaneously after the correction. Thus, the above embodiment can provide high quality images that are free from irregular intervals of scanning lines without being subjected to restrictions in terms of the positional arrangement of the photosensitive drum 8, the fold mirror and/or the other components.

[Embodiment 3]

Figure 5:
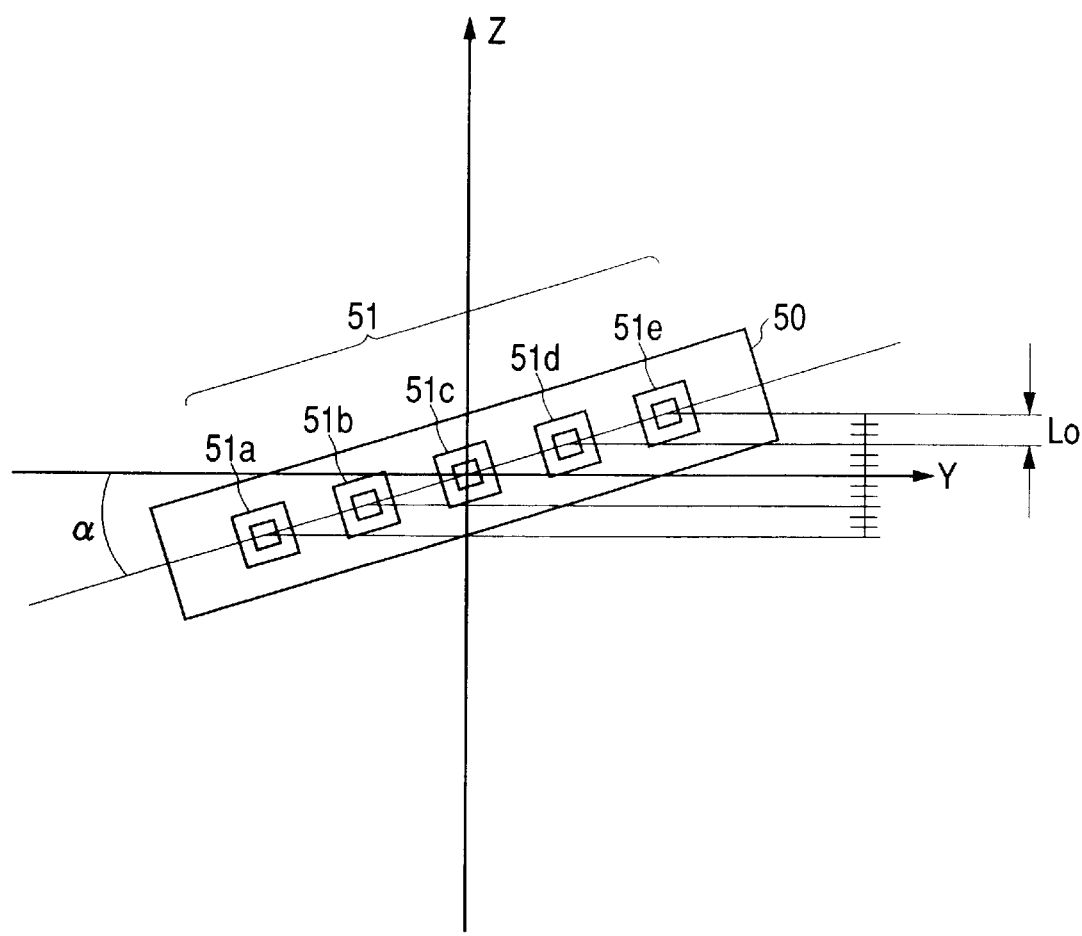
FIG. 5 is a schematic cross sectional view of the light source of Embodiment 3 of multibeam scanning apparatus according to the invention taken along the sub-scanning direction.

FIG. 5 is a schematic cross sectional view of the light source of Embodiment 3 of multibeam scanning apparatus according to the invention taken along a plane which is perpendicular to the optical axis.

This embodiment differs from above described Embodiment 2 in that the intervals of the five light emitting sections are made to be equal to a desired value (regular intervals) by causing the light source to rotate around an axis parallel to the optical axis.

Referring to FIG. 5, reference symbol Y denotes the main-scanning direction and reference symbol Z denotes the sub-scanning direction, while reference numeral 50 denotes the light source comprising a monolithic semiconductor laser array of five linearly arranged light emitting sections 51*a* through 51*e*.

As pointed out above, it has been experimentally proven that the errors in the intervals of scanning lines do not give rise to any visually remarkable irregularity if they are less than ±10% of the intervals of scanning lines as defined by the pixel density in the sub-scanning direction. Therefore, the five light emitting sections 51*a* through 51*e* may be provided with a certain degree of freedom for selecting the gap in the sub-scanning direction.

As described above by referring to formula (6), the intervals of scanning lines are on the basis of the differences $\Delta\theta$ of the angles of incidence of adjacently located beams striking the surface of the photosensitive drum. Thus, the gaps separating the five light emitting sections 51*a* through 51*e* should be so selected that the differences $\Delta\theta$ of the angles of incidence of adjacently located beams are found within ±5%.

The angle of incidence $\theta$ (rad) of a light beam striking the surface of a photosensitive drum having a radius of curvature of r (mm) and the difference $\Delta\theta$ of the angles of incidence of the light beam and an adjacent light beam separated by gap Li (mm) shows the relationship as defined by formula (9) below.

$$\Delta\theta = \sin^{-1}\left(\frac{Li}{r} + \sin\theta\right) - \theta \quad (9)$$

From formula (6), the interval Li$\theta$ (mm) of the two scanning lines on the surface of the photosensitive drum is expressed by formula (10) below.

$$Li\theta = r\left\{\sin^{-1}\left(\frac{Li}{r} + \sin\theta\right) - \theta\right\} \quad (10)$$

Thus, regular intervals can be secured by making the interval Li$\theta$ (mm) of any two scanning lines on the surface of the photosensitive drum equal to the value determined as a function of the pixel density A (dpi) in the sub-scanning direction as expressed by formula (11) below.

$$Li\theta = \frac{25.4}{A} \quad (11)$$

The intervals of scanning lines can be confined to ±10% when the difference $\Delta\theta$ (rad) of the angles of incidence of any two incident light beams satisfies equation (12) below.

$$\frac{25.4}{A} \times 0.95 \le \Delta\theta \times r \le \frac{25.4}{A} \times 1.05 \quad (12)$$

In other words, the gap Li (mm) separating a light beam and an adjacently located light beam should satisfy equation (13) below.

$$r\left\{\sin\left(\frac{25.4}{A \times r} + \theta\right) - \sin\theta\right\} \times 0.95 \le Li \le r\left\{\sin\left(\frac{25.4}{A \times r} + \theta\right) - \sin\theta\right\} \times 1.05 \quad (13)$$

Then, the gap Lo (mm) separating any two adjacent ones of the five light emitting sections 51*a* through 51*e* is expressed by formula (14), using the gap Li (mm) separating any two adjacently located light beams and the total lateral magnification $\beta s$ (times) in the sub-scanning direction.

$$Lo = \frac{Li}{\beta s} \quad (14)$$

In other words, the gap Lo (mm) separating any two adjacent ones of the five light emitting sections 51*a* through 51*e* should satisfy formula (15) below.

$$\frac{r}{\beta s}\left\{\sin\left(\frac{25.4 \times 0.95}{A \times r} + \theta\right) - \sin\theta\right\} \le \quad (15)$$

$$Lo \le \frac{r}{\beta s}\left\{\sin\left(\frac{25.4 \times 1.05}{A \times r} + \theta\right) - \sin\theta\right\}$$

Thus, with this embodiment, the irregularity of the intervals of scanning lines is corrected so that the requirement of formula (15) may be met by driving the light source 50 to rotate around an axis of rotation running in parallel with the optical axis and adjusting the gaps separating the five light emitting sections 51*a* through 51*e*.

More specifically, the gap separating any two adjacently located ones of the five light emitting sections 51*a* through 51*e* of this embodiment is 90.000 μm and the light emitting sections are arranged in a direction parallel to the main-scanning direction. Then, the gap Lo in the sub-scanning direction of any two adjacently located ones of the five light emitting sections is regulated to Lo=4.033 μm by driving the light source to rotate by 2.568(deg) around the axis of rotation running in parallel with the optical axis.

Table 4 below shows values that can be used for the embodiment.

TABLE 4

| | gap separating adjacent light emitting sections in sub-scanning direction | difference of angles of incidence | gaps separating adjacent scanning lines after correction |
|---|---|---|---|
| | Lo | $\Delta\theta$ | Li$\theta'$ |
| Li12 | 4.033 (μm) | 0.481 (deg) | 42.015 (μm) |
| Li23 | 4.033 (μm) | 0.484 (deg) | 42.223 (μm) |
| Li34 | 4.033 (μm) | 0.487 (deg) | 42.438 (μm) |
| Li45 | 4.033 (μm) | 0.488 (deg) | 42.660 (μm) |

TABLE 4-continued

|  | difference of intervals of scanning lines | error in intervals of scanning lines |
|---|---|---|
|  | ΔLiθ | RLiθ |
| Li12 | −0.318 (μm) | −0.752 (%) |
| Li23 | −0.110 (μm) | −0.261 (%) |
| Li34 | +0.105 (μm) | +0.247 (%) |
| Li45 | +0.327 (μm) | +0.772 (%) |

Note that $\Delta Li\theta = Li\theta' - Li\theta$ $RLi\theta = \Delta L\theta \times A / 25.4 \times 100$ Thus, with the above embodiment comprising a monolithic semiconductor laser array, the irregular intervals of scanning lines on the obtained image can be made unrecognizable without providing irregular intervals for the plurality of light emitting sections in the sub-scanning direction. Additionally, the monolithic semiconductor laser array of the embodiment of multibeam optical scanning apparatus is made rotatable so that the apparatus may be manufactured and regulated in a simple manner.

[Embodiment 4]

Figure 6:
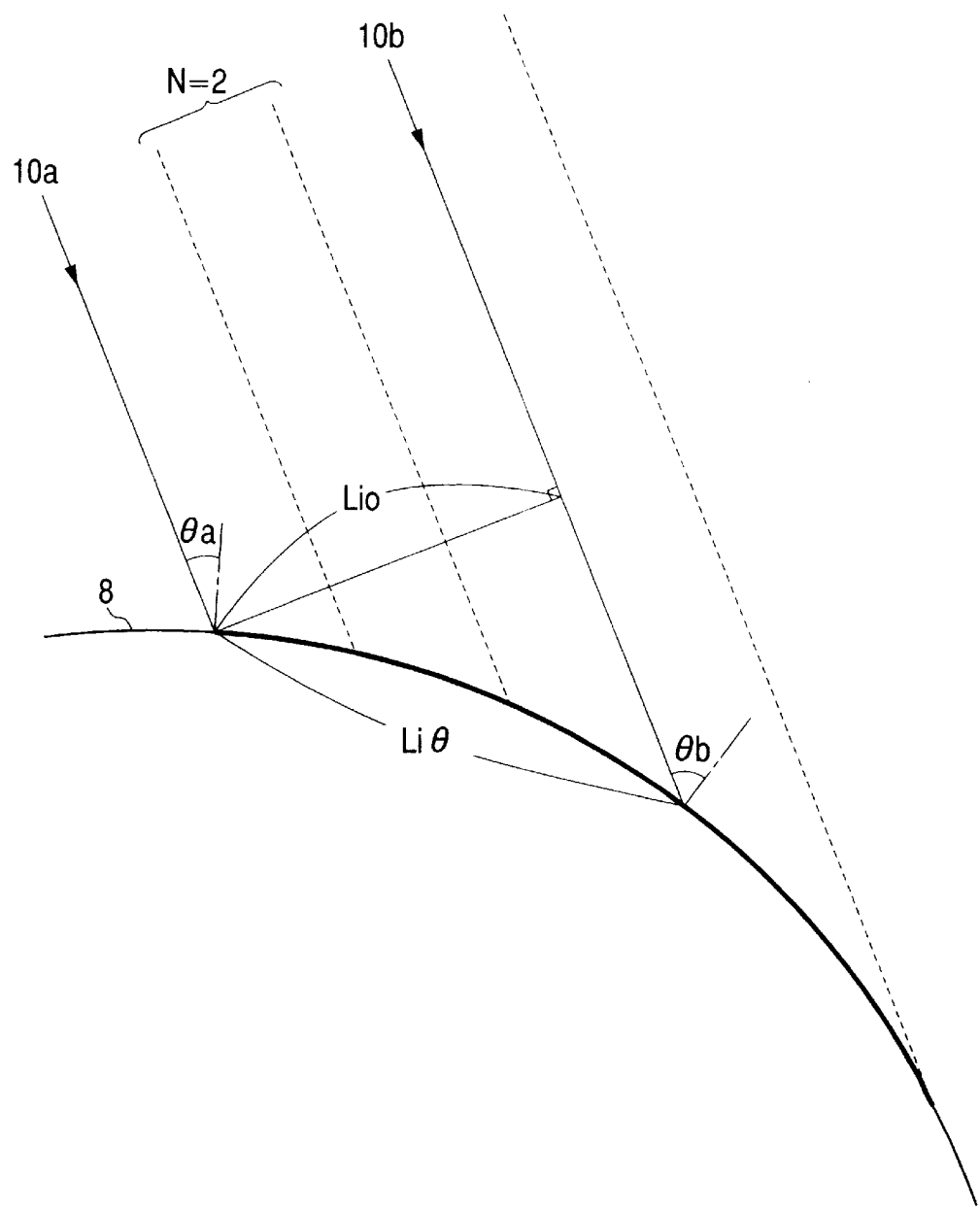
FIG. 6 is a schematic cross sectional view of Embodiment 4 of multibeam scanning apparatus according to the invention taken along the sub-scanning direction, illustrating a plurality of light beams striking the surface of the photosensitive drum thereof.

FIG. 6 is a schematic cross sectional view of Embodiment 4 of multibeam scanning apparatus for conducting interlaced scanning according to the invention taken along the sub-scanning direction, illustrating a plurality of light beams striking the surface of the photosensitive drum thereof. Note that the components of this embodiment similar to those of FIG. 3 are denoted respectively by the same reference symbols.

This embodiment differs from above described Embodiments 1, 2 and 3 in that an interlaced scanning method is employed in this embodiment. Otherwise, the embodiment has a configuration and optical functions same as that of any of the preceding embodiments. Note that the means for correcting the intervals of scanning lines in the sub-scanning direction of this embodiment is substantially same as its counterpart of any of the preceding embodiments.

More specifically, with this embodiment, some of the plurality of light emitting sections of the light source arranged in the sub-scanning direction are cyclically skipped so that the remaining light emitting sections are selectively energized to emit light according to the image information applied to it. Then, the plurality of light beams emitted from the selected light emitting sections are led to and deflected by a deflection means and the plurality of deflected light beams are made to strike the surface of a photosensitive drum with an angle of inclination θ relative to the normal of the surface of the photosensitive drum that is driven to rotate at a constant angular speed in the sub-scanning direction so that the plurality of light beams may strike the surface of the photosensitive drum at regular intervals to conduct an interlaced scanning in order to record image information on the surface of the photosensitive drum.

Referring to FIG. 6, two light beams emitted from the light source are led to the surface of the photosensitive drum simultaneously. Note that two lines indicated by broken lines in FIG. 6 are skipped by either of the two light beams 10a and 10b indicated by solid lines. In other words, two light emitting sections of the light source are skipped for emission of scanning light beams. Such a scanning technique is generally referred to as interlaced scanning and normally accompanied by a problem that scanning lines are separated by large intervals particularly when many lines are skipped at a time.

However, the intervals of scanning lines on the surface of the photosensitive drum are corrected to show respective desired values in the sub-scanning direction by appropriately adjusting the gaps separating the plurality of light emitting sections as in the case of above Embodiment 3.

If the number of light emitting sections (lines) that are skipped at a time in this embodiment is N, the gap Liθ (mm) separating a light beam and an adjacent light beam on the surface of the photosensitive drum in the sub-scanning direction is expressed by formula (16) below, using the pixel density A (dpi) in the sub-scanning direction.

$$Li\theta = \frac{25.4}{A} \times (N+1) \tag{16}$$

Thus, the gap on the surface of the photosensitive drum is equal to the gap obtained on the basis of a pixel density of 1/(N+1) in the sub-scanning direction.

The difference Δθ (rad) of the angles of incidence should satisfy the requirement of formula (c) in order to confine the errors in the gaps separating the scanning lines to less than ±10%.

$$\frac{25.4 \times (N+1)}{A \times r} \times 0.95 \leq \Delta\theta \leq \frac{25.4 \times (N+1)}{A \times r} \times 1.05 \tag{c}$$

In other words, the gap Li (mm) separating a light beam and another adjacently located light beam should satisfy equation (17) below as in the case of equation (13).

$$r\left[\sin\left\{\frac{25.4 \times (N+1)}{A \times r} + \theta\right\} - \sin\theta\right] \times 0.95 \leq$$

$$Li \leq r\left[\sin\left\{\frac{25.4 \times (N+1)}{A \times r} + \theta\right\} - \sin\theta\right] \times 1.05 \tag{17}$$

Additionally, from formula (14) it will be appreciated that the gap Lo (mm) separating any two adjacently located ones of the plurality of light emitting sections should satisfy formula (18) below.

$$\frac{r}{\beta s}\left[\sin\left\{\frac{25.4 \times (N+1) \times 0.95}{A \times r} + \theta\right\} - \sin\theta\right] \leq$$

$$Lo \leq \frac{r}{\beta s}\left[\sin\left\{\frac{25.4 \times (N+1) \times 1.05}{A \times r} + \theta\right\} - \sin\theta\right] \tag{18}$$

Table 5 below shows values that can be used for the embodiment.

TABLE 5

| pixel density in sub-scanning direction | total lateral magnification in sub-scanning direction | radius of curvature of outer periphery of photosensitive drum | angle of incidence on photosensitive drum |
|---|---|---|---|
| A | βs | r | θ |
| 600 (dpi) | 9 (times) | 5 (mm) | 30 (deg) |

| number of skipped light | gap separating adjacent light emitting sections in sub-scanning direction after | gap separating adjacent light beams after |
|---|---|---|

TABLE 5-continued

| emitting sections | skipping N light emitting sections | skipping N light beams |
|---|---|---|
| N | Lo | Li |
| 2 | 12.130 (μm) | 127.000 (μm) |

Thus, the gap separating two light beams in the sub-scanning direction after skipping two scanning lines with a pixel density of 600 (dpi) is equal to 127 μm, which is also equal to the gap separating two light beams in the sub-scanning direction with a pixel density of 200 (dpi). Therefore, the gap Lo (mm) separating two adjacent ones of the plurality of light emitting sections in the sub-scanning direction is adjusted by driving the light source to rotate around an axis of rotation running in parallel with the optical axis as in the case of Embodiment 3.

Thus, this embodiment of multibeam scanning apparatus can provide high quality images without irregular intervals of scanning lines even when some of the plurality of light emitting sections are skipped and the surface of the photosensitive drum is scanned by light beams that are separated from each other by large gaps.

What is claimed is:

1. A multibeam scanning apparatus comprising:
a light source having a plurality of light emitting sections arranged at intervals in a sub-scanning direction;
a light deflector for deflecting a plurality of light beams emitted respectively from the plurality of light emitting sections; and
a photosensitive drum to be scanned in a main-scanning direction by the plurality of light beams deflected by said light deflector, the plurality of light beams being adapted to strike said photosensitive drum with an angle of inclination of θ relative to the normal of the surface of said photosensitive drum as viewed in the sub-scanning direction so as to make said photosensitive drum be scanned by the plurality of light beams at predetermined intervals,
wherein the intervals between any two adjacently located light beams of the plurality of light beams striking said photosensitive drum are so selected as to be smaller than the predetermined intervals on the basis of the angle θ,
wherein said multibeam scanning apparatus satisfies the relationship as defined by the formula below:

$$r\left\{\sin\left(\frac{25.4}{A\times r}+\theta\right)-\sin\theta\right\}\times 0.95 \le Li \le r\left\{\sin\left(\frac{25.4}{A\times r}+\theta\right)-\sin\theta\right\}\times 1.05$$

where Li (mm) is a gap separating any two adjacent ones of the plurality of light beams striking said photosensitive drum, θ (rad.) is the angle of incidence of one of the plurality of light beams striking said photosensitive drum in the sub-scanning direction, A (dpi) is a pixel density of an image formed on said photosensitive drum by the plurality of light beams in the sub-scanning direction, and r (mm) is the radius of curvature of the outer periphery of said photosensitive drum in cross section in the sub-scanning direction.

2. A multibeam scanning apparatus comprising:
a light source having a plurality of light emitting sections arranged at intervals in a sub-scanning direction;
a light deflector for deflecting a plurality of light beams emitted respectively from the plurality of light emitting sections; and
a photosensitive drum to be scanned in a main-scanning direction by the plurality of light beams deflected by said light deflector, the plurality of light beams being adapted to strike said photosensitive drum with an angle of inclination of θ relative to the normal of the surface of said photosensitive drum as viewed in the sub-scanning direction so as to make said photosensitive drum be scanned by the plurality of light beams at predetermined intervals;
wherein the intervals separating the plurality of light emitting sections of said light source in the sub-scanning direction are so selected as to be smaller than the predetermined intervals on the basis of the angle θ,
wherein said multibeam scanning apparatus satisfies the relationship as defined by the formula below:

$$r\left\{\sin\left(\frac{25.4}{A\times r}+\theta\right)-\sin\theta\right\}\times 0.95 \le Li \le r\left\{\sin\left(\frac{25.4}{A\times r}+\theta\right)-\sin\theta\right\}\times 1.05$$

where Li (mm) is a gap separating any two adjacent ones of the plurality of light beams striking said photosensitive drum, θ (rad.) is the angle of incidence of one of the plurality of light beams striking said photosensitive drum in the sub-scanning direction, A (dpi) is a pixel density of an image formed on said photosensitive drum by the plurality of light beams in the sub-scanning direction, and r (mm) is the radius of curvature of the outer periphery of said photosensitive drum in cross section in the sub-scanning direction.

3. A multibeam scanning apparatus according to claim 1 or 2, wherein the predetermined intervals correspond to a pixel density of the image formed on said photosensitive drum by the plurality of light beams in the sub-scanning direction.

4. A multibeam scanning apparatus according to claim 1 or 2, further comprising:
an optical system for forming spot images of the plurality of light beams emitted from said light source on said photosensitive drum;
said multibeam scanning apparatus satisfying the relationship as defined by the formula below:

$$\frac{25.4\times\cos\theta}{A\times\beta s}\times 0.95 \le Lo \le \frac{25.4\times\cos\theta}{A\times\beta s}\times 1.05$$

where βs (times) is an absolute value of the lateral magnification of the optical system in the sub-scanning direction, θ (rad.) is the angle of incidence of one of the plurality of light beams striking said photosensitive drum in the sub-scanning direction, A (dpi) is a pixel density of the image formed on said photosensitive drum by the plurality of light beams in the sub-scanning direction, and Lo (mm) is a gap separating any adjacent ones of the plurality of light emitting sections in the sub-scanning direction.

5. A multibeam scanning apparatus according to claim 1 or 2, wherein said multibeam scanning apparatus satisfies the relationship as defined by the formula below:

$$Li = \frac{25.4\times\cos\theta}{A}$$

where Li (mm) is a gap separating any two adjacent ones of the plurality of light beams striking said photosensitive drum, θ (rad.) is the angle of incidence of one of the plurality of light beams striking said photosensitive drum in the sub-scanning direction, and A (dpi) is a pixel density of the image formed on said photosensitive drum by the plurality of light beams in the sub-scanning direction.

6. A multibeam scanning apparatus comprising:

a light source having three or more light emitting sections arranged at intervals in a sub-scanning direction;

a light deflector for deflecting three or more light beams emitted respectively from the three or more light emitting sections; and a photosensitive drum to be scanned in a main-scanning direction by the three or more light beams deflected by said light deflector, the three or more light beams being adapted to strike said photosensitive drum with an angle inclined relative to the normal of the surface of said photosensitive drum as viewed in the sub-scanning direction, wherein the intervals separating the three or more light emitting sections of said light source in the sub-scanning direction are so selected as to make the difference between the angles of incidence of any two adjacently located light beams of the three or more light beams striking said photosensitive drum equal to a constant value.

7. A multibeam scanning apparatus according to claim 6, wherein the three or more light beams are so selected as to scan the surface of said photosensitive drum at predetermined intervals corresponding to a pixel density in the sub-scanning direction.

8. A multibeam scanning apparatus according to claim 6, wherein said multibeam scanning apparatus satisfies the relationship as defined by the formula below:

$$\Delta\theta = \sin^{-1}\left(\frac{25.4}{A \times r} + \sin\theta\right) - \theta$$

$$0 \le \theta < \frac{\pi}{2}$$

where θ (rad.) is the angle of incidence of one of the three or more light beams striking said photosensitive drum in the sub-scanning direction, Δθ (rad.) is the difference of the angles of incidence of any two adjacent ones of the three or more light beams, A (dpi) is a pixel density of the image formed on said photosensitive drum by the three or more light beams in the sub-scanning direction, and r (mm) is the radius of curvature of the outer periphery of said photosensitive drum in cross section in the sub-scanning direction.

9. A multibeam scanning apparatus according to claim 8, wherein gaps separating adjacent light beams of the three or more light beams are different from each other.

10. A multibeam scanning apparatus according to claim 8, wherein the intervals in the sub-scanning direction between the three or more light emitting sections of said light source are different from each other.

11. A multibeam scanning apparatus according to claim 6, further comprising:

an optical system for forming spot images of the three or more light beams emitted from said light source on said photosensitive drum;

said multibeam scanning apparatus satisfying the relationship as defined by the formula below:

$$Lo = \frac{r}{\beta s}\left\{\sin\left(\frac{25.4}{A \times r} + \theta\right) - \sin\theta\right\}$$

where βs (times) is an absolute value of the lateral magnification of the optical system in the sub-scanning direction, θ (rad.) is the angle of incidence of one of the three of more light beams striking said photosensitive drum in the sub-scanning direction, A (dpi) is a pixel density of the image formed on said photosensitive drum by the three or more light beams in the sub-scanning direction, r (mm) is the radius of curvature of the outer periphery of said photosensitive drum in cross section in the sub-scanning direction, and Lo (mm) is a gap separating any adjacent ones of the three or more light emitting sections in the sub-scanning direction.

12. A multibeam scanning apparatus according to claim 6, wherein gaps separating adjacent light beams of the three or more light beams are different from each other.

13. A multibeam scanning apparatus according to claim 11, wherein the intervals in the sub-scanning direction between the three or more light emitting sections of said light source are different from each other.

14. A multibeam scanning apparatus according to claim 6, wherein said multibeam scanning apparatus satisfies the relationship as defined by the formula below:

$$\frac{25.4}{A \times r} \times 0.95 \le \Delta\theta \le \frac{25.4}{A \times r} \times 1.05$$

where Δθ (rad.) is the difference between the angles of incidence of any two adjacent ones of the three or more light beams, A (dpi) is a pixel density of the image formed on said photosensitive drum by the three or more light beams in the sub-scanning direction, and r (mm) is the radius of curvature of the outer periphery of said photosensitive drum in cross section in the sub-scanning direction.

15. A multibeam scanning apparatus according to claim 6, wherein said multibeam scanning apparatus satisfies the relationship as defined by the formula below:

$$r\left\{\sin\left(\frac{25.4}{A \times r} + \theta\right) - \sin\theta\right\} \times 0.95 \le Li \le r\left\{\sin\left(\frac{25.4}{A \times r} + \theta\right) - \sin\theta\right\} \times 1.05$$

where Li (mm) is a gap separating any two adjacent ones of the three or more light beams striking said photosensitive drum, θ (rad.) is the angle of incidence of one of the three or more light beams striking said photosensitive drum in the sub-scanning direction, A (dpi) is a pixel density of the image formed on said photosensitive drum by the three or more light beams in the sub-scanning direction, and r (mm) is the radius of curvature of the outer periphery of said photosensitive drum in cross section in the sub-scanning direction.

16. A multibeam scanning apparatus according to claim 6, further comprising:

an optical system for forming spot images of the three or more light beams emitted from said light source on said photosensitive drum;

said multibeam scanning apparatus satisfying the relationship as defined by the formula below:

$$\frac{r}{\beta s}\left\{\sin\left(\frac{25.4 \times 0.95}{A \times r} + \theta\right) - \sin\theta\right\} \le Lo \le \frac{r}{\beta s}\left\{\sin\left(\frac{25.4 \times 1.05}{A \times r} + \theta\right) - \sin\theta\right\}$$

where βs (times) is an absolute value of the lateral magnification of the optical system in the sub-scanning direction, θ (rad.) is the angle of incidence of one of the three of more light beams striking said photosensitive drum in the sub-scanning direction, A (dpi) is a pixel density of the image formed on said photosensitive drum by the three or more light beams in the sub-scanning direction, r (mm) is the radius of curvature of the outer periphery of said photosensitive drum in cross section in the sub-scanning direction, and Lo (mm) is a gap separating any adjacent ones of the three or more light emitting sections in the sub-scanning direction.

17. A multibeam scanning apparatus comprising:

a light source having a plurality of light emitting sections arranged at intervals in a sub-scanning direction, said light source being adapted to cyclically skip one or more scanning lines;

a light deflector for deflecting a plurality of light beams emitted from said light source; and a photosensitive drum to be scanned in a main-scanning direction by the plurality of light beams deflected by said light deflector, the plurality of light beams being adapted to strike said photosensitive drum with an angle of inclination of θ relative to the normal of the surface of said photosensitive drum as viewed in the sub-scanning direction so as to make said photosensitive drum be scanned by the plurality of light beams at predetermined intervals;

wherein the intervals separating the plurality of light emitting sections of said light source in the sub-scanning direction are so selected as to be smaller than the predetermined intervals on the basis of the angle θ, wherein said multibeam scanning apparatus satisfies the relationship as defined by the formula below:

$$r\left[\sin\left(\frac{25.4 \times (N-1)}{A \times r} + \theta\right) - \sin\theta\right] \times 0.95 \le$$
$$Li \le r\left[\sin\left(\frac{25.4 \times (N+1)}{A \times r} + \theta\right) - \sin\theta\right] \times 1.05$$

where Li (mm) is a gap separating any two adjacent ones of the plurality of light beams striking said photosensitive drum, θ (rad.) is the angle of incidence of one of the plurality of light beams striking said photosensitive drum in the sub-scanning direction, A (dpi) is a pixel density of the image formed on said photosensitive drum by the plurality of light beams in the sub-scanning direction, r (mm) is the radius of curvature of the outer periphery of said photosensitive drum in cross section in the sub-scanning direction, and N is the number of skipped scanning lines.

18. A multibeam scanning apparatus comprising:

a light source having a plurality of light emitting sections arranged at intervals in a sub-scanning direction, said light source being adapted to cyclically skip one or more scanning lines;

a light deflector for deflecting a plurality of light beams emitted from said light source;

a photosensitive drum to be scanned in a main-scanning direction by the plurality of light beams deflected by said light deflector, the plurality of light beams being adapted to strike said photosensitive drum with an angle of inclination of θ relative to the normal of the surface of said photosensitive drum as viewed in the sub-scanning direction so as to make said photosensitive drum be scanned by the plurality of light beams at predetermined intervals; and an optical system for forming spot images of the plurality of light beams emitted from said light source on said photosensitive drum, wherein the intervals separating the plurality of light emitting sections of said light source in the sub-scanning direction are so selected as to be smaller than the predetermined intervals on the basis of the angle θ, and wherein said apparatus satisfies the relationship as defined by the formula below:

$$\frac{r}{\beta s}\left[\sin\left(\frac{25.4 \times (N+1) \times 0.95}{A \times r} + \theta\right) - \sin\theta\right] \le$$
$$Lo \le \frac{r}{\beta s}\left[\sin\left(\frac{25.4 \times (N+1) \times 1.05}{A \times r} + \theta\right) - \sin\theta\right]$$

where βs (times) is an absolute value of the lateral magnification of the optical system in the sub-scanning direction, θ (rad.) is the angle of incidence of one of plurality of light beams striking said photosensitive drum in the sub-scanning direction, A (dpi) is a pixel density of the image formed on said photosensitive drum by the plurality of light beams in the sub-scanning direction, r (mm) is the radius of curvature of the outer periphery of said photosensitive drum in cross section in the sub-scanning direction, and Lo (mm) is a gap separating any adjacent ones of the plurality of light emitting sections in the sub-scanning direction.

19. A multibeam scanning apparatus according to claim 17 or 18, wherein the predetermined intervals correspond to the pixel density of the image formed on said photosensitive drum by the plurality of light beams in the sub-scanning direction.

20. A multibeam scanning apparatus comprising:

a light source having three or more light emitting sections arranged at intervals in a sub-scanning direction, said light source being adapted to cyclically skip one or more scanning lines;

a light deflector for deflecting the three or more light beams emitted from said light source; and a photosensitive drum to be scanned in a main-scanning direction by the three or more light beams deflected by said light deflector, the three or more light beams being adapted to strike said photosensitive drum with an angle inclined relative to the normal of the surface of said photosensitive drum as viewed in the sub-scanning direction, wherein the intervals separating the light emitting sections of said light source in the sub-scanning direction are so selected as to make the difference between the angles of incidence of any two adjacently located light beams of said three or more light beams striking said photosensitive drum equal to a constant value.

21. A multibeam scanning apparatus according to claim 20, wherein the intervals separating the three or more light beams on said photosensitive drum correspond to a pixel density of an image formed on said photosensitive drum in the sub-scanning direction.

22. A multibeam scanning apparatus according to claim 20, wherein said multibeam scanning apparatus satisfies the relationship as defined by the formula below:

$$\frac{25.4 \times (N+1)}{A \times r} \times 0.95 \leq \Delta\theta \leq \frac{25.4 \times (N+1)}{A \times r} \times 1.05$$

where Δθ (rad.) is the difference between the angles of incidence of any two adjacent ones of the three or more light beams, A (dpi) is a pixel density of the image formed on said photosensitive drum in the sub-scanning direction, r (mm) is the radius of curvature of the outer periphery of said photosensitive drum in cross section in the sub-scanning direction, and N is the number of skipped scanning lines.

23. A multibeam scanning apparatus according to claim 20, wherein said multibeam scanning apparatus satisfies the relationship as defined by the formula below:

$$r\left[\sin\left\{\frac{25.4 \times (N+1)}{A \times r} + \theta\right\} - \sin\theta\right] \times 0.95 \leq$$
$$Li \leq r\left[\sin\left\{\frac{25.4 \times (N+1)}{A \times r} + \theta\right\} - \sin\theta\right] \times 1.05$$

where Li (mm) is a gap separating any two adjacent ones of the three or more light beams striking said photosensitive drum, θ (rad.) is the angle of incidence of one of the three or more light beams striking said photosensitive drum in the sub-scanning direction, A (dpi) is a pixel density of the image formed on said photosensitive drum by the three or more light beams in the sub-scanning direction, r (mm) is the radius of curvature of the outer periphery of said photosensitive drum in cross section in the sub-scanning direction, and N is the number of skipped scanning lines.

24. A multibeam scanning apparatus according to claim 20, further comprising:
an optical system for forming spot images of the three or more light beams emitted from said light source on said photosensitive drum;
said multibeam scanning apparatus satisfying the relationship as defined by the formula below:

$$\frac{r}{\beta s}\left[\sin\left\{\frac{25.4 \times (N+1) \times 0.95}{A \times r} + \theta\right\} - \sin\theta\right] \leq$$
$$Lo \leq \frac{r}{\beta s}\left[\sin\left\{\frac{25.4 \times (N+1) \times 1.05}{A \times r} + \theta\right\} - \sin\theta\right]$$

where βs (times) is an absolute value of the lateral magnification of the optical system in the sub-scanning direction, θ (rad.) is the angle of incidence of one of the three of more light beams striking said photosensitive drum in the sub-scanning direction, A (dpi) is a pixel density of the image formed on said photosensitive drum in the sub-scanning direction, Lo (mm) is a gap separating any adjacent ones of the three or more light emitting sections in the sub-scanning direction, r (mm) is the radius of curvature of the outer periphery of said photosensitive drum in cross section in the sub-scanning direction, and N is the number of skipped lines.

25. A multibeam scanning apparatus comprising:
a light source having a plurality of light emitting sections arranged at intervals in a sub-scanning direction;
a light deflector for deflecting a plurality of light beams emitted respectively from the plurality of light emitting sections;
an imaging plane to be scanned in a main-scanning direction by the plurality of light beams deflected by said light deflector, the plurality of light beams being adapted to strike said imaging plane with an angle of inclination of θ relative to the normal of the surface of said imaging plane as viewed in the sub-scanning direction; and
a detection element arranged at a position optically equivalent to that of said imaging plane to detect imaging positions of the plurality of light beams emitted from said light source,
wherein said detection element is inclined in the sub-scanning direction by an angle of θ relative to the normal of the surface of said imaging plane in order to adjust the intervals of the plurality of light emitting sections of said light source in the sub-scanning direction on the basis of the imaging positions as detected by said detection element.

26. A multibeam scanning apparatus comprising:
a light source having three or more light emitting sections arranged at intervals in a sub-scanning direction, said light source being adapted to cyclically skip one or more light emitting sections and make a selected light emitting section emit a light beam;
a light deflector for deflecting a plurality of light beams emitted from said light source;
an imaging plane to be scanned in a main-scanning direction by the plurality of light beams deflected by said light deflector, the plurality of light beams being adapted to strike said imaging plane with an angle of inclination of θ relative to the normal of the surface of said imaging plane as viewed in the sub-scanning direction; and
a detection element arranged at a position optically equivalent to that of said imaging plane to detect imaging positions of the plurality of light beams emitted from said light source,
wherein said detection element is inclined in the sub-scanning direction by an angle of θ relative to the normal of the surface of said imaging plane in order to adjust the intervals of the three or more light emitting sections of said light source in the sub-scanning direction on the basis of the imaging positions as detected by said detection element.

27. A multibeam scanning apparatus comprising:
a light source having three or more light emitting sections arranged at intervals at least in a sub-scanning direction;
a light deflector for deflecting three or more light beams emitted respectively from the three or more light emitting sections; and
an imaging plane to be scanned in a main-scanning direction by the three or more light beams deflected by said light deflector, the three or more light beams being adapted to strike said imaging plane with a predetermined angle θ of incidence relative to the normal of said imaging plane as viewed in the sub-scanning direction,
wherein a gap Li separating any two adjacent ones of the three or more light beams in the sub-scanning direction is so selected as to be smaller than a length Liθ corresponding to a pixel density A in the sub-scanning direction of said imaging plane,
wherein said multibeam scanning apparatus satisfies the relationship as defined by the formula:

$$\frac{25.4 \times \cos\theta}{A} \times 0.95 \leq Li \leq \frac{25.4 \times \cos\theta}{A} \times 1.05.$$

28. A multibeam scanning apparatus comprising:
a light source having three or more light emitting sections arranged at intervals at least in a sub-scanning direction;
a light deflector for deflecting three or more light beams emitted respectively from the three or more light emitting sections; and
an imaging plane to be scanned in a main-scanning direction by the three or more light beams deflected by said light deflector, the three or more light beams being adapted to strike said imaging plane with a predetermined angle θ of incidence relative to the normal of said imaging plane as viewed in the sub-scanning direction,
wherein a gap Lo separating any two adjacent ones of the three or more light emitting sections in the sub-scanning direction is so selected as to be smaller than a length Liθ corresponding to a pixel density A in the sub-scanning direction of said imaging plane,
wherein said multibeam scanning apparatus satisfies the relationship as defined by the formula:

$$\frac{25.4 \times \cos\theta}{A \times \beta s} \times 0.95 \leq Lo \leq \frac{25.4 \times \cos\theta}{A \times \beta s} \times 1.05,$$

where βs is the lateral magnification in the sub-scanning direction of the overall optical system of the multibeam scanning apparatus.

29. A multibeam scanning apparatus comprising:
a light source having three or more light emitting sections arranged at intervals in a sub-scanning direction;
a light deflector for deflecting three or more light beams emitted respectively from the three or more light emitting sections; and
a photosensitive drum to be scanned in a main-scanning direction by the three or more light beams deflected by said light deflector, the three or more light beams being adapted to strike said photosensitive drum with an angle of inclination of θ relative to the normal of the surface of said photosensitive drum as viewed in the sub-scanning direction so as to make said photosensitive drum be scanned by the three or more light beams at predetermined intervals,
wherein the intervals between any two adjacently located light beams of the three or more light beams striking said photosensitive drum are so selected as to be smaller than the predetermined intervals on the basis of the angle θ,
wherein said multibeam scanning apparatus satifies the relationship as defined by the formula below:

$$r\left\{\sin\left(\frac{25.4}{A \times r} + \theta\right) - \sin\theta\right\} \times 0.95 \leq Li \leq r\left\{\sin\left(\frac{25.4}{A \times r} + \theta\right) - \sin\theta\right\} \times 1.05$$

where Li (mm) is a gap separating any two adjacent ones of the three or more light beams striking said photosensitive drum, θ (rad.) is the angle of incidence of one of the the three or more light beams striking said photosensitive drum in the sub-scanning direction, A (dip) is a pixel density of an image formed on said photosensitive drum by the three or more light beams in the sub-scanning direction, and r (mm) is the radius of curvature of the outer periphery of said photosensitive drum in cross section in the sub-scanning direction.

30. A multibeam scanning apparatus comprising:
a light source having three or more light emitting sections arranged at intervals in a sub-scanning direction;
a light deflector for deflecting three or more light beams emitted respectively from the three or more light emitting sections; and
a photosensitive drum to be scanned in a main-scanning direction by the three or more light beams deflected by said light deflector, the three or more light beams being adapted to strike said photosensitive drum with an angle of inclination of θ relative to the normal of the surface of said photosensitive drum as viewed in the sub-scanning direction so as to make said photosensitive drum be scanned by the three or more light beams at predetermined intervals,
wherein the intervals separating the three or more light emitting sections of said light source in the sub-scanning direction are so selected as to be smaller than the predetermined intervals on the basis of the angle θ,
wherein said multibeam scanning apparatus satisfies the relationship as defined by the formula below:

$$r\left\{\sin\left(\frac{25.4}{A \times r} + \theta\right) - \sin\theta\right\} \times 0.95 \leq Li \leq r\left\{\sin\left(\frac{25.4}{A \times r} + \theta\right) - \sin\theta\right\} \times 1.05$$

where Li (mm) is a gap separating any two adjacent ones of the three or more light beams striking said photosensitive drum, θ (rad.) is the angle of incidence of one of the three or more light beams striking said photosensitive drum in the sub-scanning direction, A (dpi) is a pixel density of an image formed on said photosensitive drum by the three or more light beams in the sub-scanning direction, and r (mm) is the radius of curvature of the outer periphery of said photosensitive drum in cross section in the sub-scanning direction.

31. A multibeam scanning apparatus according to claim 29 or 30, wherein the predetermined intervals correspond to a pixel density of the image formed on said photosensitive drum by the three or more light beams in the sub-scanning direction.

32. A multibeam scanning apparatus according to claim 29 or 30, further comprising:
an optical system for forming spot images of the three or more light beams emitted from said light source on said photosensitive drum;
said multibeam scanning apparatus satisfying the relationship as defined by the formula below:

$$\frac{25.4 \times \cos\theta}{A \times \beta s} \times 0.95 \leq Lo \leq \frac{25.4 \times \cos\theta}{A \times \beta s} \times 1.05$$

where βs (times) is an absolute value of the lateral magnification of the optical system in the sub-scanning direction, θ (rad.) is the angle of incidence of one of the three or more light beams striking said photosensitive drum in the sub-scanning direction, A (dpi) is a pixel density of the image formed on said photosensitive drum by the three or more light beams in the sub-scanning direction, and Lo (mm) is a gap separating any adjacent ones of the three or more light emitting sections in the sub-scanning direction.

33. A multibeam scanning apparatus according to claim 29 or 30, wherein said multibeam scanning apparatus satisfies the relationship as defined by the formula below:

$$Li = \frac{25.4 \times \cos\theta}{A}$$

where Li (mm) is a gap separating any two adjacent ones of the three or more light beams striking said photosensitive drum, θ (rad.) is the angle of incidence of one of the three or more light beams striking said photosensitive drum in the sub-scanning direction, and A (dpi) is a pixel density of the image formed on said photosensitive drum by the three or more light beams in the sub-scanning direction.

34. A laser beam printer having a multibeam scanning apparatus according to any one of claims 1, 2, 6, 17, 18, 20 and 25 to 30.

* * * * *

UNITED STATES PATENT AND TRADEMARK OFFICE
CERTIFICATE OF CORRECTION

PATENT NO. : 6,593,954 B2
DATED : July 15, 2003
INVENTOR(S) : Keiichiro Ishihara It is certified that error appears in the above-identified patent and that said Letters Patent is hereby corrected as shown below:

Column 4,
Line 45, "e relative" should read -- $\theta$ relative --.

Column 8,
Line 64, "1on" should read -- 1 on --.

Column 9,
Table 1, "imageing otical" should read -- imaging optical --; and
"3.915 (pm)" should read -- 3.915 ($\mu$m )--; and
Line 27, "arriving" should read -- arriving at --.

Column 12,
Table 2, "latral" should read -- lateral --; and "sub-scaning" should read -- sub-scanning --; and
Line 43, "beam" should read -- beams --.

Column 20,
Line 9, "three of" should read -- three or --; and
Line 18, "claim 6," should read -- claim 11, --.

Column 21,
Line 8, "three of" should read -- three or --; and"

2nd Formula, "$r\left[\sin\left\{\frac{25.4 \times (N-1)}{A \times r} + \theta\right\} - \sin\theta\right] \times 0.95 \leq Li \leq r\left[\sin\left\{\frac{25.4 \times (N+1)}{A \times r} + \theta\right\} - \sin\theta\right] \times 1.05$"

should read-- $r\left[\sin\left\{\frac{25.4 \times (N+1)}{A \times r} + \theta\right\} - \sin\theta\right] \times 0.95 \leq Li \leq r\left[\sin\left\{\frac{25.4 \times (N+1)}{A \times r} + \theta\right\} - \sin\theta\right] \times 1.05$ --.

Column 23,
Line 52, "three of" should read -- three or --.

UNITED STATES PATENT AND TRADEMARK OFFICE
CERTIFICATE OF CORRECTION

PATENT NO. : 6,593,954 B2
DATED : July 15, 2003
INVENTOR(S) : Keiichiro Ishihara It is certified that error appears in the above-identified patent and that said Letters Patent is hereby corrected as shown below:

Column 23,
Line 53, "three of" should read -- three or --.

Column 25,
Line 53, "satifies" should read -- satisfies --;
Line 63, "the the" should read -- the --; and
Line 65, "(dip)" should read -- (dpi) --.

Signed and Sealed this

Thirtieth Day of March, 2004

JON W. DUDAS
*Acting Director of the United States Patent and Trademark Office*